United States Patent [19]
Lee et al.

[11] Patent Number: 5,745,601
[45] Date of Patent: Apr. 28, 1998

[54] ROBUSTNESS OF CLASSIFICATION MEASUREMENT APPARATUS AND METHOD

[75] Inventors: Shih-Jong J. Lee, Bellevue; Michael G. Meyer, Seattle; Chih-Chau L. Kuan, Redmond; Paul S. Wilhelm, Kirkland, all of Wash.

[73] Assignee: NeoPath, Inc., Redmond, Wash.

[21] Appl. No.: 509,181

[22] Filed: Jul. 31, 1995

[51] Int. Cl.$^6$ .................................................. G06K 9/00
[52] U.S. Cl. .................................... 382/225; 382/228
[58] Field of Search ........................ 382/133, 134, 382/170, 171, 173, 224, 225, 228, 309

[56] References Cited

U.S. PATENT DOCUMENTS

| | | | |
|---|---|---|---|
| 3,824,393 | 7/1974 | Brain | 250/222 PC |
| 4,034,342 | 7/1977 | Kruklitis | 340/146.3 AG |
| 4,085,006 | 4/1978 | Mindick et al. | 195/103.7 |
| 4,175,860 | 11/1979 | Bacus | 356/39 |
| 4,812,412 | 3/1989 | Turner | 436/15 |
| 4,839,194 | 6/1989 | Malluche et al. | 427/2 |
| 4,949,388 | 8/1990 | Bhaskaram | 382/10 |
| 4,965,725 | 10/1990 | Rutenberg | 364/413.1 |
| 5,029,226 | 7/1991 | Klein et al. | 382/50 |
| 5,048,095 | 9/1991 | Bhanu et al. | 382/9 |
| 5,072,382 | 12/1991 | Kamentsky | 364/413.08 |
| 5,077,807 | 12/1991 | Bokser | 382/14 |
| 5,078,952 | 1/1992 | Gozani et al. | 376/159 |
| 5,139,031 | 8/1992 | Guirguis | 128/771 |
| 5,153,439 | 10/1992 | Gozani et al. | 250/390.04 |
| 5,257,182 | 10/1993 | Luck et al. | 364/413.1 |
| 5,260,871 | 11/1993 | Goldberg | 364/413.02 |
| 5,263,097 | 11/1993 | Katz et al. | 382/48 |
| 5,287,272 | 2/1994 | Rutenberg et al. | 364/413.01 |
| 5,313,532 | 5/1994 | Harvey et al. | 382/15 |
| 5,315,700 | 5/1994 | Johnston et al. | 395/163 |
| 5,317,653 | 5/1994 | Eschbach et al. | 382/50 |
| 5,335,291 | 8/1994 | Kramer et al. | 382/14 |
| 5,357,977 | 10/1994 | Michels | 128/758 |
| 5,361,140 | 11/1994 | Hayenga et al. | 358/446 |
| 5,487,117 | 1/1996 | Burges et al. | 382/173 |

FOREIGN PATENT DOCUMENTS

| | | | |
|---|---|---|---|
| 0 621 556 | 10/1994 | European Pat. Off. | 382/224 |
| 87/07057 | 11/1987 | WIPO | 382/173 |

OTHER PUBLICATIONS

Chow et al., "Robustness Test of an Incipient Fault Detector Artificial Neural Network", Department of Electrical and Computer Engineering, North Carolina State University, Raleigh, NC, 27695–7911, pp. I–73 –I–78, *International Joint Conference on Neural Networks*, Jul. 8–12, 1991 proceedings, ©1991 IEEE.

McAulay et al., "Robust Aircraft Classification Using Moment Invariants, Neural Network, and Split Inversion Learning", Wright State University, Dept. of Computer Science and Engineering, Dayton, OH 45435, *International Joint Conference on Neural Networks*, Jul. 8–12, 1991 proceedings, Abstract only.

(List continued on next page.)

*Primary Examiner*—Andrew Johns
*Attorney, Agent, or Firm*—Hans I. Sun; Emil Moffa

[57] ABSTRACT

A classifier measures robustness responsive to object presentation effects and decision boundary effects. A cytological image analysis computer obtains objects of interest and classifies them responsive to a decision tree classifier. The robustness of classification is calculated dynamically as objects are classified responsive to a segmentation robustness and a classification decisiveness measure. The results of the decisiveness measure and the segmentation robustness data are combined to provide enhanced overall classification reliability.

73 Claims, 10 Drawing Sheets

OTHER PUBLICATIONS

Zhou et al., "A Statistical–Heuristic Feature Selection Criterion for Decision Tree Induction", pp. 834–841, *IEEE Transactions on Pattern Analysis and Machine Intelligence*, vol. 13, No. 8, Aug. 1991, ©1991, IEEE.

Bacus, James W. and Les J. Grace, "Optical Microscope System For Standardized Cell Measurements and Analyses", *Applied Optics*, 26:16, pp. 3280–3293, 15 Aug. 1987.

Bartels, Peter H., et al., "A Self–Learning Computer Program for Cell Recognition", *ACTA Cytologica: The Journal of Clinical Cytology*, 14:8, pp. 486–494, Oct. 1970.

Tanaka, Noboru, et al., "Automated Cytologic Screening System (CYBEST Model 4): an Integrated Image Cytometry System", Reprinted from *Applied Optics*, vol. 26, No. 16, pp. 3301–3307, Aug. 15, 1987. Copyright© 1987 by the Optical Society of America and reprinted by permission of the copyright owner.

Duda, Richard O. and Peter E. Hart, "Fisher's Linear Discriminant", *Patent Classification and Scene Analysis*, Copyright ©1973, pp. 114–119.

Dytch, Harvey E. et al., "An Interactive Microcomputer–Based System for the Quantitative Analysis of Stratified Tissue Sections", *Analytical and Quantitative Cytology and Histology*, vol. 9, No. 1, pp. 69–78, Mar. 1987.

Enslein, Kurt and Peter W. Neurath, "Augmented Stepwise Discriminant Analysis Applied to Two Classification Problems in the Biomedical Field", *Computers and Biomedical Research*, 2, 568–581 (1969).

Kurman, Robert J. et al., "Part 1: Specimen Adequacy" and Part 2: Descriptive Diagnoses, *The Bethesda System for Reporting Cervical/Vaginal Cytologic Diagnoses*, © 1994 Springer–Verlag, pp. 1–81.

Smith, Warren J., "Modern Optical Engineering: The Design of Optical Systems", Copyright ©1966 by McGraw–Hill Book Company, pp. 308–325.

Weber, J.E. et al., "Fuzzy Reasoning, Possibility Theory and Probability Theory in Expert Systems for Histopathology", IEEE/Ninth Annual Conference of the Engineering in Medicine and Biology Society, pp. 1560–1561, ©1987.

Wied, G.L. et al., "Expert Systems as Classifiers in Diagnostic Cytopathology", IEEE/Ninth Annual Conference of the Engineering in Medicine and Biology Society, pp. 1915–1917, ©1987.

Wied, G.L. et al., "Expert System Design Under Uncertainty of Human Diagnosticians", IEEE/Eighth Annual Conference of the Engineering in Medicine and Biology Society, pp. 757–760, ©1986.

Wied, G.L. et al., "Ticas–Stratex, and Expert Diagnostic System For Stratified Cervical Epithelium", IEEE/Ninth Annual Conference of the Engineering in Medicine and Biology Society, pp. 1557–1559, ©1987.

Serra, J., *Image Analysis and Mathematical Morphology*, pp. 372–423, Academic Press, 1982.

Patten, Jr., Stanley, "Diagnostic Cytopathology of the Uterine Cervix", Basel, Switzerland, Publisher: S. Karger, 1969, 2nd Edition 1978, Third volume in *Monographs in Clinical Cytology*, edited by G.L. Wied, pp. 10–15, 1–9.

Patten, Jr., Stanley, "The Automation of Uterine Cancer Cytology", *Sensitivity and Specificity of Routine Diagnostic Cytology*, Tutorials of Cytology, Chicago, IL, 1976, edited by Wied, Bahr and Bartels, pp. 406–419.

Lundsteen, C., et al., Abstract from *Clin Genet.*, Department of Obstetrics and Gynecology, Rigshospitalet, Copenhagen, Denmark, vol. 45, No. 2, Feb. 1994, pp. 62–66.

Kaplow, L.S., Abstract from *Histochem Cytochem.*, vol. 25, No. 8, Aug. 1977, pp. 990–1000.

DARK EDGE

BRIGHT EDGE

FILL HOLE

DARK EDGE

BRIGHT EDGE

FILL HOLE

ROBUSTNESS OF CLASSIFICATION MEASUREMENT APPARATUS AND METHOD

APPARATUS AND METHOD

This invention relates to a method and apparatus for characterizing the reliability of information in an image interpretation system, and, more particularly, to a method and apparatus for measuring the robustness of classification of a cytological screening system.

BACKGROUND OF THE INVENTION

Optical classification systems, such as systems designed to screen images for objects of interest, capture an image with a camera. Such systems typically include a focusing mechanism and an illuminator. Variations in focus and illumination of these systems are small, but the small variations have a significant impact on image quality. This influence, in turn, has a correspondingly small but significant effect on the classification assigned to objects found in the image. In an optical classification system, a segmentation step identifies objects of interest. Features are subsequently computed for each object. A feature is a measure of an object that is used in the process of assigning a classification result to the object. The classification result assigned to objects may change when noise affects segmentation or when noise affects the features that are computed for the objects.

Object-based classification, such as the object-based classification done by the AutoPap 300 from NeoPath of Redmond, Wash. is performed on conventionally prepared papanicolaou stained biological specimens collected during a gynecological examination. Objects classified are miscellaneous artifacts, biological cells, or cell nuclei. The process of object-based classifiction culminates with all objects being classified for a specimen. From the object classification results an anomaly score or quality control score is calculated. The value of the calculated score determines whether a given slide will be sorted for human review. This score is the result of two activities: first, the object classifier provides a classification result for each object; second, the classification results for all objects are used as input to a slide level classifier whose output is the slide-based score. The accuracy with which slide classification may be accomplished is dependent on the accuracy of the object level data. Object level data can be inaccurate when the objects are prone to the effects of system noise.

Therefore, it is one motive of the invention to provide a classifier that identifies the objects whose classification results are likely to be most sensitive to system noise.

SUMMARY OF THE INVENTION

The invention provides a method for measuring information reliability in an image interpretation system comprising the steps of obtaining at least one image; obtaining image information about said at least one image by interpreting said at least one image; extracting at least one reliability feature; and evaluating said at least one reliability feature against at least one predetermined criteria to obtain at least one information reliability measurement. The method further comprises the step of improving said reliability of said image information by changing said interpretation of said at least one image in response to said at least one information reliability measurement.

The invention also provides an information reliability measuring apparatus for measuring information reliability in an image interpretation system comprising: means for obtaining at least one image having at least one image output; means for obtaining image information about said at least one image, connected to said at least one image output, by interpreting said at least one image, wherein said means for obtaining image information has an image information output; means for extracting at least one reliability feature connected to said image information output and wherein the means for extracting further has a reliability feature output; and means for evaluating said at least one reliability feature against at least one predetermined criteria to obtain at least one information reliability measurement connected to the reliability feature output and wherein the means for evaluating has an information reliability measurement output. The apparatus further comprises a means for improving said reliability of said image information by changing said interpretation of said at least one image in response to said at least one information reliability measurement connected to the information reliability measurement output and image information output, wherein the means for improving said reliability has an improved image information output.

The invention also provides a method for measuring object segmentation robustness comprising the steps of: identifying at least one object; computing at least one segmentation robustness feature of said at least one object; and computing an object segmentation robustness measure responsive to said at least one segmentation robustness feature.

Further, the invention provides an object segmentation robustness measurement apparatus comprising: means for identifying at least one object having at least one object output; means for computing at least one segmentation robustness feature of said at least one object connected to said at least one object output, wherein the means for computing at least one segmentation robustness feature has at least one segmentation robustness feature output; and means for computing an object segmentation robustness measure responsive to said at least one segmentation robustness feature, connected to said at least one segmentation robustness feature output.

The invention further provides a method for robust object classification comprising the steps of: identifying at least one object; classifying said at least one object to provide at least one object classification result; and computing a classification decisiveness measure for said at least one object classification result.

The invention also provides an apparatus for the measurement of object classification robustness comprising: means for identifying at least one object having at least one object output; means for classifying said at least one object to provide at least one object classification result connected to said at least one object output; means for evaluating robustness of segmentation of said at least one object to provide a segmentation robustness measure connected to said at least one object output; and means for evaluating decisiveness of classification of said at least one object to provide a classification decisiveness measure connected to said at least one object classification result.

It is one object of the invention to provide a classifier which identifies objects which are prone to the effects of system noise on segmentation.

It is another object of the invention to provide a classifier which identifies objects whose classification results are not decisive.

Other objects, features and advantages of the present invention will become apparent to those skilled in the art through the description of the preferred embodiment, claims and drawings herein wherein like numerals refer to like elements.

BRIEF DESCRIPTION OF THE DRAWINGS

To illustrate this invention, a preferred embodiment will be described herein with reference to the accompanying drawings.

DETAILED DESCRIPTION OF THE PREFERRED EMBODIMENT

Figure 1A:
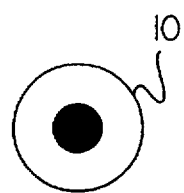
FIG. 1A shows an example of an object resulting in robust classification.

One indication of a cytological specimen classifier's quality is its ability to consistently classify multiple images of the same object, in spite of either, small changes in the appearance of the object, or small changes in feature measurements of the object. Take, for example, a classifier employing object segmentation where one step of classification includes generating a segmentation mask. A high quality classifier would be able to classify each object repeatably even though the feature values computed for each object segmentation changed slightly from image to image.

There are at least two major causes of nonrepeatable classification, namely, object presentation effects and decision boundary effects.

Object Presentation Effects

Object presentation effects arise from object presentation changes that affect segmentation, thus changing feature measurements, and therefore potentially causing changes in classification.

As an indication of object presentation effects, the invention computes segmentation robustness features that relate to instabilities in segmentation. These features are then used in a classifier that yields a segmentation robustness measure for each object. The segmentation robustness measure indicates the potential variability of the segmentation mask created for an object in an image. An object with robust segmentation is one where the segmentation mask correctly identifies the nucleus and does not vary from image to image in the case where multiple images are made of the same object.

Decision Boundary Effects

Decision boundary effects arise from objects that have feature values close to decision boundaries of a classifier, where small changes in these features' values could potentially cause changes in classification.

As an indication of decision boundary effects, the invention computes a classification decisiveness measure for each object. The classification decisiveness measure indicates the potential variability in the classification result of an object as a measure of variation in feature values and the proximity of the object to decision boundaries in a feature space. The classification decisiveness measure will be high if the object's features are far from decision boundaries, meaning that the classification result will be repeatable even if the feature values change by small amounts.

The invention uses two classifiers to rank the classification robustness of an object. One measures the classification robustness as affected by the segmentation robustness. The other measures the classification robustness as affected by the classification decisiveness. The Segmentation Robustness Measure classifier ranks how prone the object is to variable segmentation. The Classification Decisiveness Measure classifier ranks the object in terms of its proximity to a classifier decision boundary in feature space.

The method and apparatus of the invention provides information on the number of objects on a slide and the likelihood for each that it is prone to the effects of system variation. This information is used by the slide level classification process to normalize for these effects leading to improved slide level classification accuracy.

Object Presentation Effects

The presentation of cells affects object segmentation results. One example of an object with robust segmentation is a free lying cell with high contrast between the nucleus and cytoplasm. Objects with low contrast, or which have several objects in proximity may have nonrobust segmentation. Segmentation robustness and classification accuracy have a direct relationship. Objects with robust segmentation are more likely to have an accurate segmentation mask permitting subsequent classification to be more accurate. Objects with nonrobust segmentation are more likely to have inaccurate segmentation masks making the classification of the object less reliable. The segmentation robustness measure is used to rank objects according to their likelihood for repeatable segmentation in the case where multiple images are made of the same object.

FIGS. 1A–1D illustrate the effect of object presentation on segmentation. Automated cytological analysis may be done, for example, by the AutoPap® 300 System using a strobe to illuminate the field of view. Slight variations in illumination intensity occur leading to images of varying brightness. Objects that have a high contrast between the nucleus and cytoplasm, such as object 10 shown in FIG. 1A, tend to segment the same from image to image even when the image brightness varies from image to image. Objects with high nuclei to cytoplasm contrast are considered to have robust segmentation.

Figure 1B:
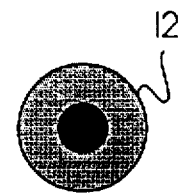
FIGS. 1B, 1C and 1D show examples of three objects resulting in nonrobust classification.
Figure 1C:
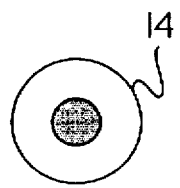

Objects that have low contrast, such as objects 12, 14 shown in FIGS. 1B and 1C respectively, are more likely to segment differently when the image brightness varies. Such objects are considered to have nonrobust segmentation.

Figure 1D:
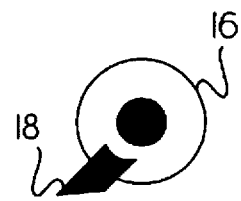

Another cause of nonrobust segmentation is the proximity of two objects. See, for example, objects 16, 18 as is shown in FIG. 1D. The segmentation of such very proximate objects tends to be nonrobust because the segmentation process may group the objects.

Decision Boundary Effects

Figure 2:
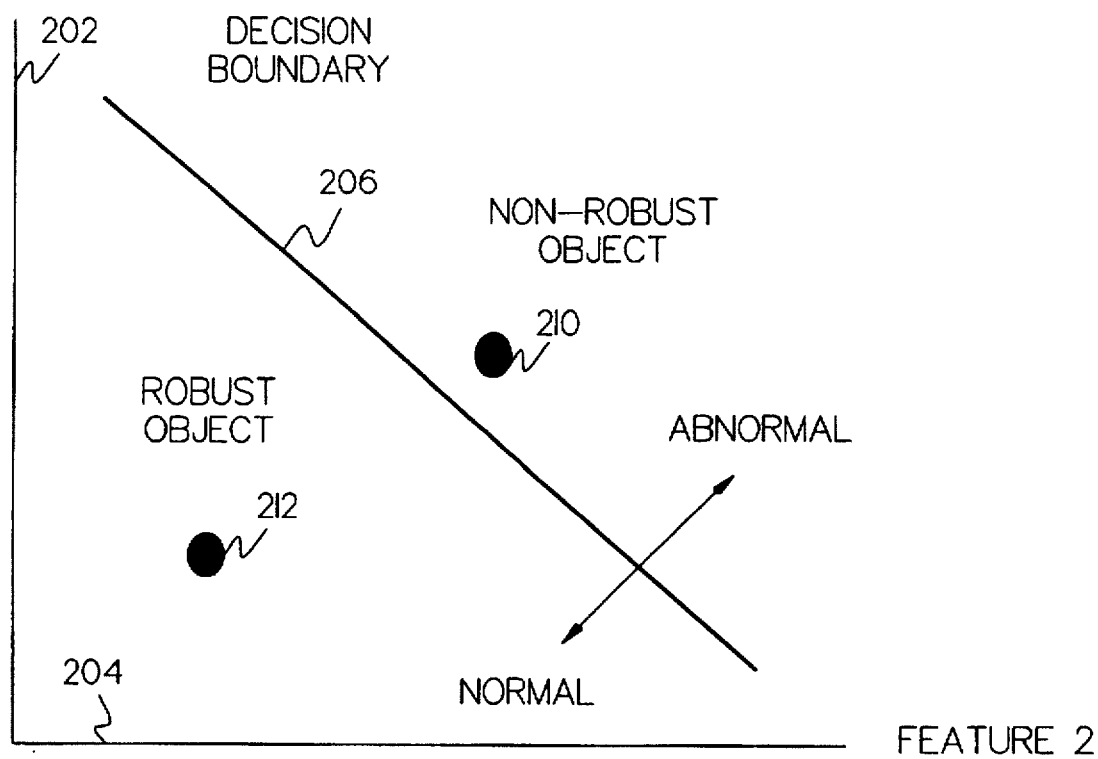
FIG. 2 shows a decision boundary with objects.

Referring now to FIG. 2, FIG. 2 graphically illustrates the decision boundary effect. FIG. 2 shows a feature 1 axis 202, a feature 2 axis 204, a decision boundary 206, an object 210, and another object 212. For objects with features in proximity to decision boundaries, a small amount of variation in feature values may push objects to the other side of the decision boundary 206, and the classification result would change. As a result, these objects tend to have nonrobust classification results. On the other hand, objects with features that are far away from the decision boundary, such as object 212, are not affected by small changes in feature values and are considered to have more robust classification results.

Variable Segmentation Example

In one embodiment of the invention, objects in an image are identified using an image segmentation algorithm. The image segmentation algorithm is described in assignee's U.S. patent application Ser. No. 08/179,812 filed Jan. 10, 1994 which is a continuation in part of U.S. patent application Ser. No. 07/838,395, entitled "Method For Identifying Objects Using Data Processing Techniques", by S. James Lee, et al., filed Feb. 18, 1992, which is incorporated by reference hereto. In summary, the segmentation algorithm comprises the following steps:

| Step | Process |
| --- | --- |
| 1 | Pre-processing, |
| 2 | Using histogram statistics, |
| 3 | Performing background normalization, |
| 4 | Performing enhanced image generation, |
| 5 | Thresholding image generation, |
| 6 | Applying thresholding, |
| 7 | Performing dark edge incorporation, |
| 8 | Performing bright edge exclusion, |
| 9 | Filling holes, |
| 10 | Performing object separation and recovery, and |
| 11 | Performing high threshold inclusion and low value pick up. |

The areas of the segmentation that are more sensitive to small changes in brightness or contrast are steps 7, 8, and 9. Those skilled in the art will recognize that other operations that are sensitive to imaging variations could also be used.

Figure 3:
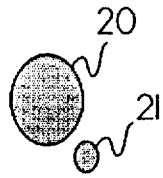
FIG. 3 shows examples of images of objects that have robust segmentation.
Figure 4A:
FIGS. 4A, 4B, 4C and 4D show dark edge incorporated images.
Figure 4B:
Figure 4C:
Figure 4D:
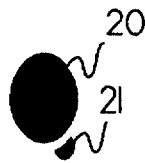
Figure 5A:
FIGS. 5A, 5B, 5C and 5D show dark edge incorporated images segmenting nonrobustly.
Figure 5B:
Figure 5C:
Figure 5D:

Referring now jointly to FIG. 3, FIGS. 4A, 4B, 4C and 4D and FIGS. 5A, 5B, 5C and 5D, examples of the operational effects of steps 7, 8 and 9 above are there illustrated. In some cases the operation of steps 7, 8 and 9 cause segmentation to be nonrobust. For example, FIG. 3 shows an object to be segmented. An object 20 comprises two proximate objects 20 and 21. FIGS. 4A, 4B, 4C and 4D progressively show the correct segmentation of the object 20 through the dark edge incorporation, FIG. 4B, bright edge exclusion, FIG. 4C, and fill holes, FIG. 4D, steps of the segmentation process. FIGS. 5A, 5B, 5C and 5D progressively illustrate a different segmentation scenario for the same object 20 that would result in an incorrect segmentation of the object as shown finally in FIG. 5D.

The dark edge incorporation step (7) attempts to enclose the region covered by the nuclear boundary. The bright edge exclusion step (8) attempts to separate nuclear objects and over-segmented artifacts, and the fill hole step (9) completes the object mask. This process is illustrated correctly in FIGS. 4A, 4B, 4C and 4D. If there is a gap in the dark edge boundary, as illustrated in FIGS. 5A, 5B, 5C and 5D, the resulting object mask is so different that the object will not be considered as a nucleus. If the object is low contrast or if the image brightness changes, the segmentation may shift from the example of FIGS. 4A, 4B, 4C and 4D to that of FIGS. 5A, 5B, 5C and 5D.

The input to the segmentation robustness measure is a set of segmentation robustness feature measurements for each object with at least a predetermined minimum likelihood of being abnormal.

The output is a number between 0.0 and 1.0 that indicates the segmentation robustness. Higher values correspond to objects with more robust segmentation.

Decision Rule for the Segmentation Robustness Measure

The segmentation robustness classifier comprises a binary decision tree that uses a linear combination of segmentation robustness features at each node to separate objects with robust segmentation from those with nonrobust segmentation. The segmentation robustness features described in the following table, Table A, make up the linear combination of the features.

TABLE A

| | Feature Description |
| --- | --- |
| mean_od | Mean optical density value of pixels in the current object. |
| sm_bright | Average intensity in a ring around a current object. |
| sm_edge_9_9 | Disparity of 1x9 and 9x1 closing residue in a ring around the current object. |
| context_3a | For this feature, the bounding box of the nucleus is expanded by 15 pixels on each side. The feature is the ratio of the area of other segmented objects which intersect the enlarged box to compactness of the box, where the compactness is defined as the perimeter of the box squared divided by the area of the box. |
| hole_percent | Ratio of the hole area to the total area in the current object mask. |
| context_1b | For this feature, the bounding box of the nucleus is expanded by 5 pixels on each side. The feature is the ratio of the area of other segmented objects which intersect the enlarged box to the total area of the enlarged box. |
| min_distance | Distance in pixels to the nearest object centroid from the current object centroid. |

The classifier was trained using 2373 objects of which 1344 were objects tending to classify robustly and 1029 were objects tending to classify nonrobustly.

Classification Decisiveness Measure

The classification decisiveness measure indicates how close the value of the linear combination of features for an object is to the decision boundary of the classifier. The decisiveness measure is calculated from the binary decision trees used in the object classification by adding information to the object classifier tree to make it a probabilistic tree.

The probabilistic tree assigns probabilities to the left and right classes at each decision node of the binary decision tree based on the proximity of the feature linear combination value to the decision boundary. When the linear combination value is close to the decision boundary, both left and right classes will be assigned a similar low decisiveness value. When the linear combination value is away from the decision boundary, the side of the tree corresponding to the classification decision will have high decisiveness value. The combined probabilities from all the decision nodes are used to predict the repeatability of classification for the object.

Computation of the Classification Decisiveness Measure

A probabilistic Fisher's decision tree (PFDT) is the same as a binary decision tree, with the addition of a probability distribution function in each nonterminal node. An object classified by a binary decision tree would follow only one path from the root node to a terminal node. The object classified by the PFDT will have a classification result based on the single path, but the probability of the object ending in each terminal node of the tree is also computed, and the decisiveness is based on those probabilities.

Figure 7:
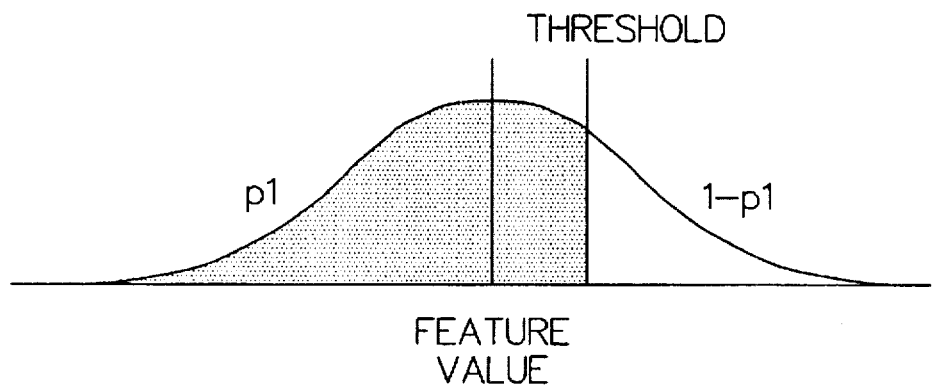
FIG. 7 shows a probability graph with a feature value threshold.
Figure 8:
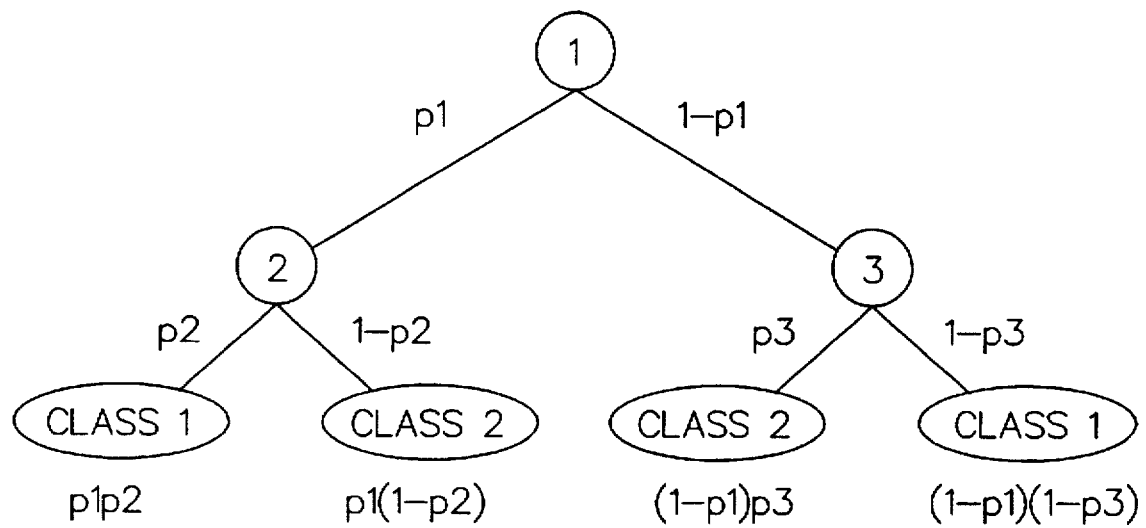
FIG. 8 shows a method for computing classification decisiveness from the binary decision tree.

FIGS. 7 and 8 show how the decisiveness measure is computed. The object is classified by the regular binary decision trees that have been modified as follows:

At each decision node, a probability is computed based on the distance between the object and the decision boundary. At the first decision node, these probabilities are shown as $p_1$ and $1-p_1$. The feature values of the objects which would be entering the classification node are assumed to have a normal distribution. This normal distribution is centered over the feature value, and the value of $p_1$ is the area of the normal distribution to the left of the threshold. If the features were close to the decision boundary, the values of $p_1$ and $1-p_1$ would be approximately equal. As the feature combination value drifts to the left of the decision boundary, the value of $p_1$ increases.

FIG. 7 shows the probabilities corresponding to how close the linear combination value lies to the decision boundary or threshold. Since different trees involve different descriminant boundaries, the decisiveness score assigned to an object is highly dependent on the configuration of the tree used to classify it.

A given tree is characterized by computing similar probability values for each decision node of the classification tree as shown in FIG. 8. The probability associated with each classification path, the path from the root node to the terminal node where the classification result is assigned, is the product of the probabilities at each branch of the tree. The probabilities associated with each terminal node is shown in FIG. 8. For example, the probability of the object being classified as class1 in the leftmost branch is $p_1 p_2$.

FIG. 8 shows the method for computing classification decisiveness from the binary decision tree. For this figure there are four paths down the decision tree. The probability for the first path is $p_1 p_2$ as shown at the bottom of the figure. The probability that the object belongs to one class is the sum of the probabilities computed for the different paths down the tree leading to each terminal node of that class. The decisiveness measure is the difference between the probability that the object belongs to class1, $p_{class1}$ and the probability that it belongs to class2, $p_{class2}$, as shown in the following relationships.

$$P_{class1} = p_1 p_2 + (1-p_1)(1-p_3)$$

$$P_{class2} = p_1(1-p_2) + (1-p_1)p_3$$

$$Decisiveness = |P_{class1} - P_{class2}|$$

Input and Output of the Classification Decisiveness Measure

In one embodiment of the invention two classification decisiveness measures are calculated. The first is for objects which have at least a first predetermined likelihood of being abnormal, such objects are identified as stage2 abnormals. The second is for objects which have at least a second higher predetermined likelihood of being abnormal, such objects are identified as stage3 abnormals.

Classification Decisiveness Measure Performance

Figure 6:
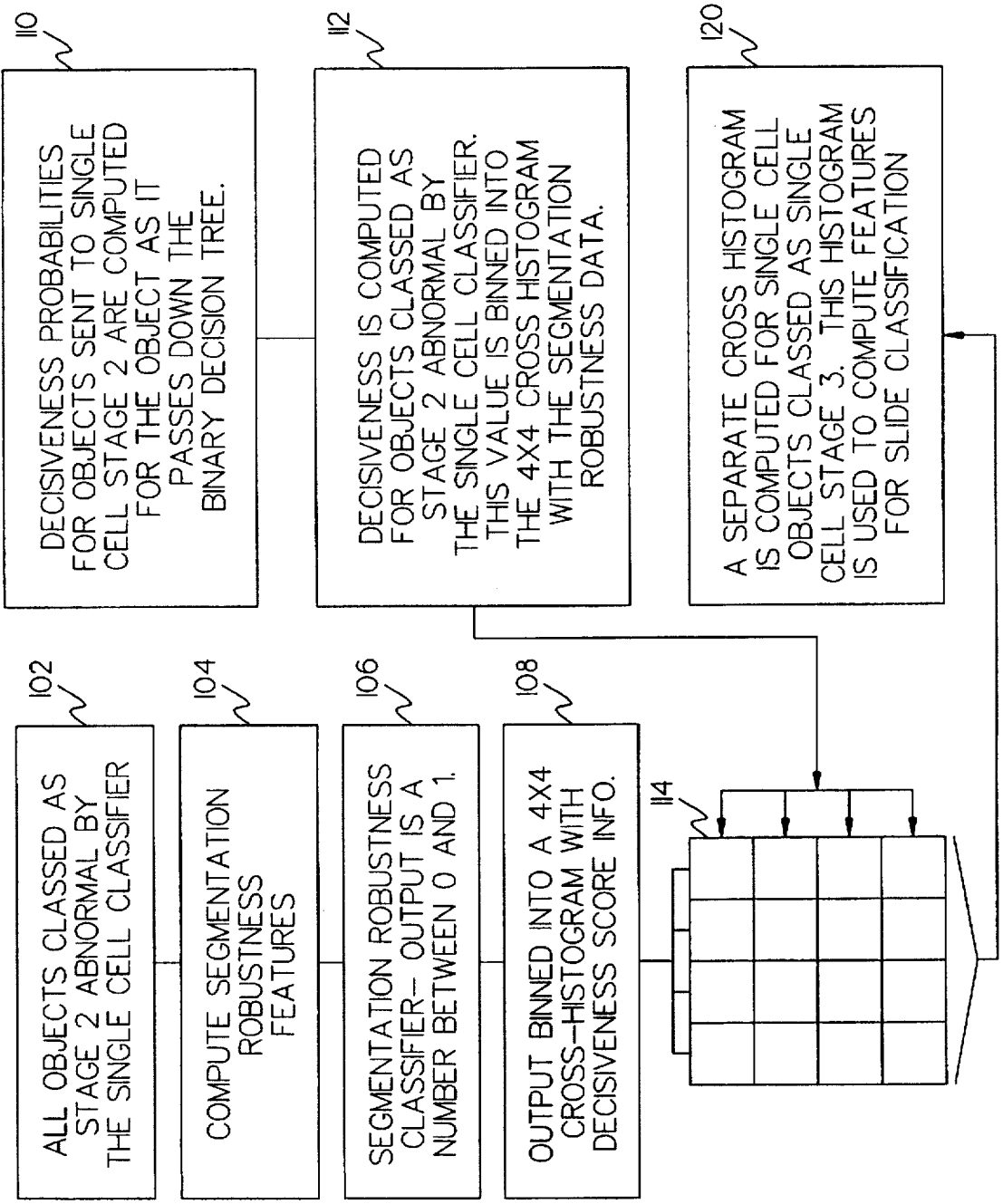
FIG. 6 shows a process flow diagram of the method of the invention to measure the robustness of classification.

FIG. 6 shows one embodiment of the method of the invention to determine the robustness of classification. In step 102 all objects classified as stage2 abnormals are examined. In step 104 the segmentation robustness features of the stage2 abnormals are computed. In step 106 a segmentation robustness classifier classifies robustness as a number between 0 and 1. In step 110 the decisiveness probabilities for objects sent to the single cell stage2 classifier are computed for the object as it passes down the binary decision tree. In step 112 decisiveness is computed for objects classed as stage2 abnormal by the single cell classifier. This value is binned into a 4×4 cross histogram, for example, with the segmentation robustness data. A separate cross histogram is computed for single cell objects classed as single cell stage3 in operation 120. The histogram from operation 120 may be used to compute features for slide classification.

The segmentation robustness measure and classification decisiveness score were developed to improve the accuracy of classification assigned to a slide. In one embodiment of the invention slide classification is accomplished in two parts. First, individual objects are classified on the slide. It is during this first process that the segmentation robustness measure and the classification decisiveness scores are computed for the objects. For slide classification features which are based on the classification assigned to objects that have been accumulated over the entire slide are used. Examples of features used to classify the slide include the total number of objects on the slide or the number of objects classified as being abnormal. FIG. 6 shows that the segmentation robustness measure and the classification decisiveness score are accumulated into a 4×4 cross histogram for example. For each object processed, thresholds are applied to the segmentation robustness measure and classification robustness score and the appropriate two dimensional bin in the cross histogram is incremented. At the completion of slide processing the cross histogram represents the robustness with which objects were classified for the slide. Single value features may be computed based on the cross histogram. For example, the mean value of the segmentation robustness measure may be computed by projecting the cross histogram onto the horizontal axis to produce a one dimensional histogram of 4 bins. The mean for the segmentation robustness is the weighted sum for the histogram divided by the number of objects in the one dimensional histogram. The mean of the decisiveness score may be computed similarly by projecting onto the vertical axis.

Following this process a group of features for the slide that may be derived from the normal classification process and another group may be derived from the robustness cross histogram.

Enhancement of slide classification accuracy through use of the robustness features may be made clear with a simple example. In the absence of the robustness features classification, accuracy would depend, for the most part, on the number of objects classified as abnormal on the slide. Slides with a low number of detected abnormal objects would be identified as normal and not processed further whereas slides with a large number of abnormal objects would be identified as requiring further human review. Inaccuracies may arise when the abnormal object classification is nonrobust or is based on an object whose segmentation is nonrobust. Under this scenario an abnormal classification may be assigned to an object erroneously thus inflating the abnormal classification count for the slide and leading to an incorrect slide classification. With the robustness features the number of abnormal objects for the slide may be adjusted by weighted versions of the robustness features. This linear combination of the features derived from normal classification along with the new robustness features provides for enhanced classification accuracy for the slide.

Figure 9:
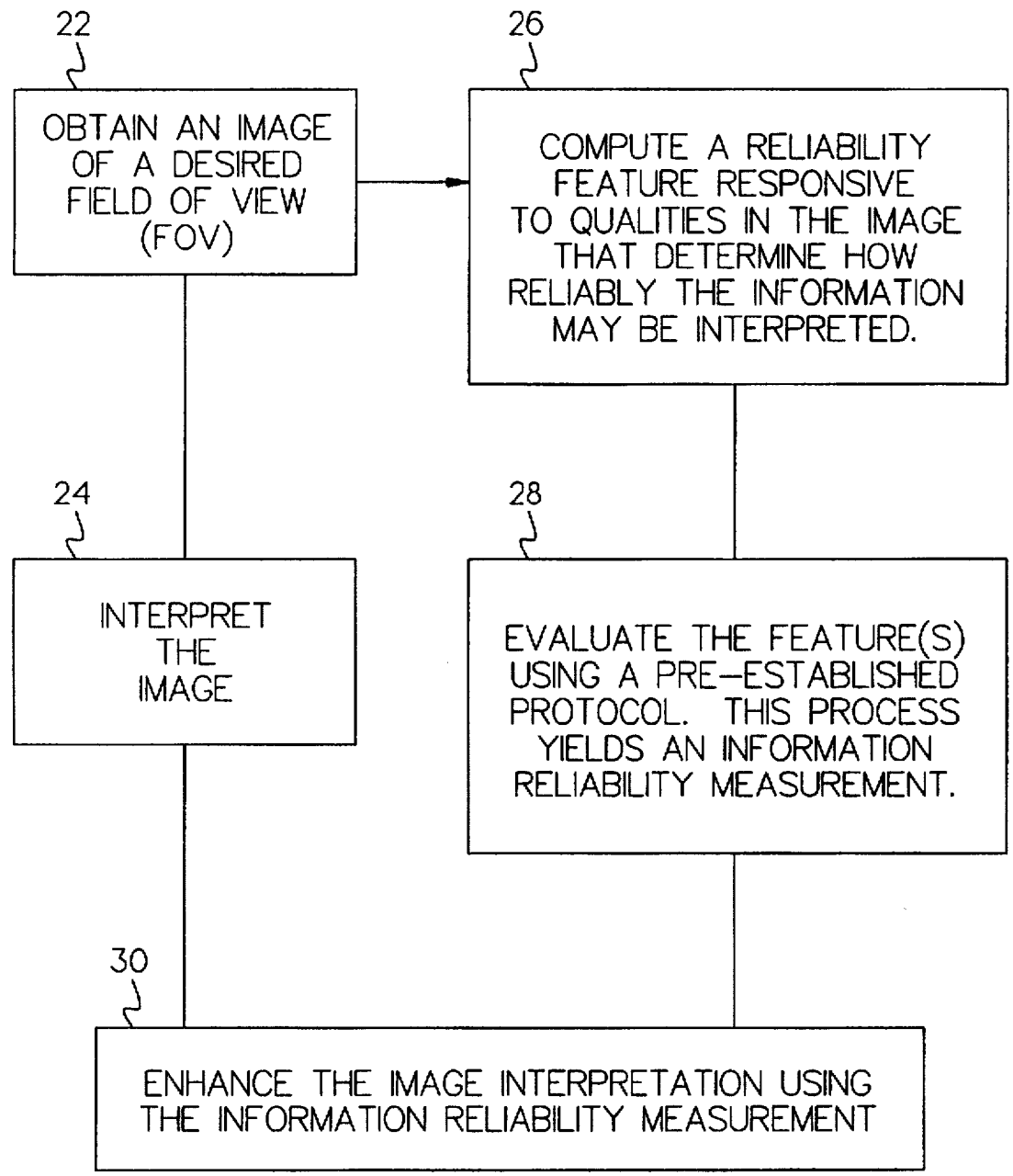
FIG. 9 shows the method of the invention used to enhance image interpretation from an information reliability measurement.

Refer now to FIG. 9, which shows the method of the invention used to enhance image interpretation from an information reliability measurement. In step 22 an image is obtained of a desired field of view. The field of view could be a field of view of a biological slide, wherein the biological slide contains biological cells with cell nuclei. The method of the invention then interprets the image in step 24. The image interpretation step comprises image processing steps for the classification of objects of interest in the field of view. In step 26, a reliability feature is computed responsive to qualities in the image that determine how reliably the information may be interpreted. Table A contains a partial list of such features, other features may also be used. The process then flows to step 28 to evaluate the features using pre-established criteria.

In one embodiment the pre-established criteria comprises either a segmentation robustness classifier or a classification decisiveness score classifier. Those skilled in the art will appreciate that other criteria may also be used without deviating from the spirit and scope of the invention. During the step of evaluating the features using a pre-established criteria, an information reliability measurement is computed. Two examples of a reliability measurement are the segmentation robustness measure, which is the output of the segmentation robustness classifier, and the classification decisiveness measure, which is the output of the classification decisiveness score classifier. The process then flows to step 30 to enhance the image interpretation using the information reliability measurement. In one example embodiment, the image interpretation is enhanced by weighting the object classification result having higher segmentation robustness measure with a higher weight and generally weighting the object classification result with a weight whose value is determined by the segmentation robustness measure.

In another example, compiling a histogram of at least one classification decisiveness measure generates histogrammed data. The invention computes classification reliability features responsive to the histogrammed data. An enhanced object classification result is then computed in response to the reliability features.

Figure 10:
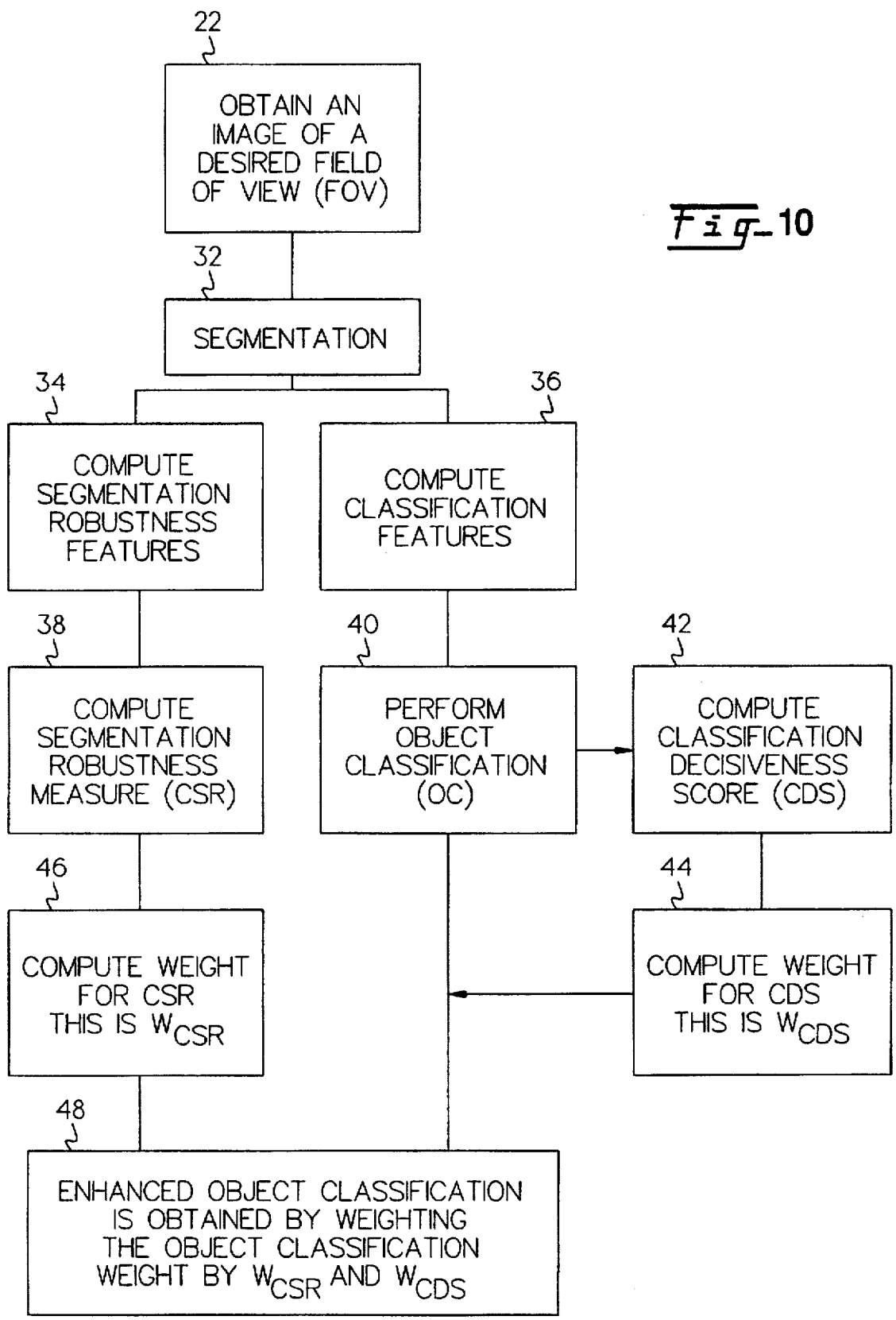
FIG. 10 shows the method of the invention used to enhance object classification.

Now refer to FIG. 10, which shows one method of the invention used to enhance object classification. The process starts at step 22 where an image of a desired field of view is obtained. In step 32, the image is segmented. The process then computes classification features in step 36. The process computes segmentation robustness features in step 34. In step 38, a segmentation robustness measure is computed as described above. Those skilled in the art will recognize that other segmentation robustness measures may also be used. In step 40 a weight is computed for the computed segmentation robustness. This is known as $W_{CSR}$. At step 40, object classification is performed. At step 42, the classification decisiveness score is computed as described above. At step 44, the weight is computed for the classification decisiveness score called $W_{CDS}$. At step 48, the object classification is enhanced by the computed segmentation robustness measure weight $W_{CSR}$ and the computed weight for the classification decisiveness score. Enhanced object classification is obtained by weighting the object classification weight by $W_{CSR}$ and $W_{CDS}$.

In one embodiment of the invention, the system disclosed herein is used in a system for analyzing cervical pap smears, such as that shown and disclosed in U.S. patent application Ser. No. 07/838,064, entitled "Method For Identifying Normal Biomedical Specimens", by Alan C. Nelson, et al., filed Feb. 18, 1992; U.S. patent application Ser. No. 08/179,812 filed Jan. 10, 1994 which is a continuation in part of U.S. patent application Ser. No. 07/838,395, entitled "Method For Identifying Objects Using Data Processing Techniques", by S. James Lee, et al., filed Feb. 18, 1992; U.S. patent application Ser. No. 07/838,070, now U.S. Pat. No. 5,315,700, entitled "Method And Apparatus For Rapidly Processing Data Sequences", by Richard S. Johnston et al., filed Feb. 18, 1992; U.S. patent application Ser. No. 07/838,065, now U.S. Pat. No. 5,361,140 entitled "Method and apparatus for Dynamic Correction of Microscopic Image Signals" by Jon W. Hayenga et al., filed Feb. 18, 1992; and U.S. patent application Ser. No. 08/302,355, filed Sep. 7, 1994 entitled "Method and apparatus for Rapid Capture of Focused Microscopic Images" to Hayenga et al., which is a continuation-in-part of application Ser. No. 07/838,063 filed on Feb. 18, 1992 the disclosures of which are incorporated herein, in their entirety, by the foregoing references thereto.

The present invention is also related to biological and cytological systems as described in the following patent applications which are assigned to the same assignee as the present invention, filed on Sep. 20, 1994 (unless otherwise noted), and which are all hereby incorporated by reference including U.S. patent application Ser. No. 08/309,118 to Kuan et al. entitled, "Field Prioritization apparatus and Method," U.S. patent application Ser. No. 08/309,061 to Wilhelm et al., entitled "Apparatus for Automated Identification of Cell Groupings on a Biological Specimen," U.S. patent application Ser. No. 08/309,116 to Meyer et al. entitled "Apparatus for Automated Identification of Thick Cell Groupings on a Biological Specimen," U.S. patent application Ser. No. 08/098,115 to Lee et al. entitled "Biological Analysis System Self Calibration Apparatus," U.S. patent application Ser. No. 08/308,992 to Lee et al. entitled "Apparatus for Identification and Integration of Multiple Cell Patterns," U.S. patent application Ser. No. 08/309,063 to Lee et al. entitled "A Method for Cytological System Dynamic Normalization," U.S. patent application Ser. No. 08/309,248 to Rosenlof et al. entitled "Method and Apparatus for Detecting a Microscope Slide Coverslip," U.S. patent application Ser. No. 08/309,077 to Rosenlof et al. entitled "Apparatus for Detecting Bubbles in Coverslip Adhesive," U.S. patent application Ser. No. 08/309,931 to Lee et al. entitled "Cytological Slide Scoring Apparatus," U.S. patent application Ser. No. 08/309,148 to Lee et al. entitled "Method and Apparatus for Image Plane Modulation Pattern Recognition", U.S. patent application Ser. No. 08/309,250 to Lee et al. entitled "Apparatus for the Identification of Free-Lying Cells," U.S. patent application Ser. No. 08/309,117 to Wilhelm et al., entitled "Method and Apparatus for Detection of Unsuitable Conditions for Automated Cytology Scoring." Also incorporated by reference is U.S. patent application Ser. No. 08/455,296, assigned to the same assignee, to Lee et al., entitled "Method and Apparatus for Continuously Monitoring and Forecasting Slide and Specimen Preparation for a Biological Specimen Population."

Figure 11A:
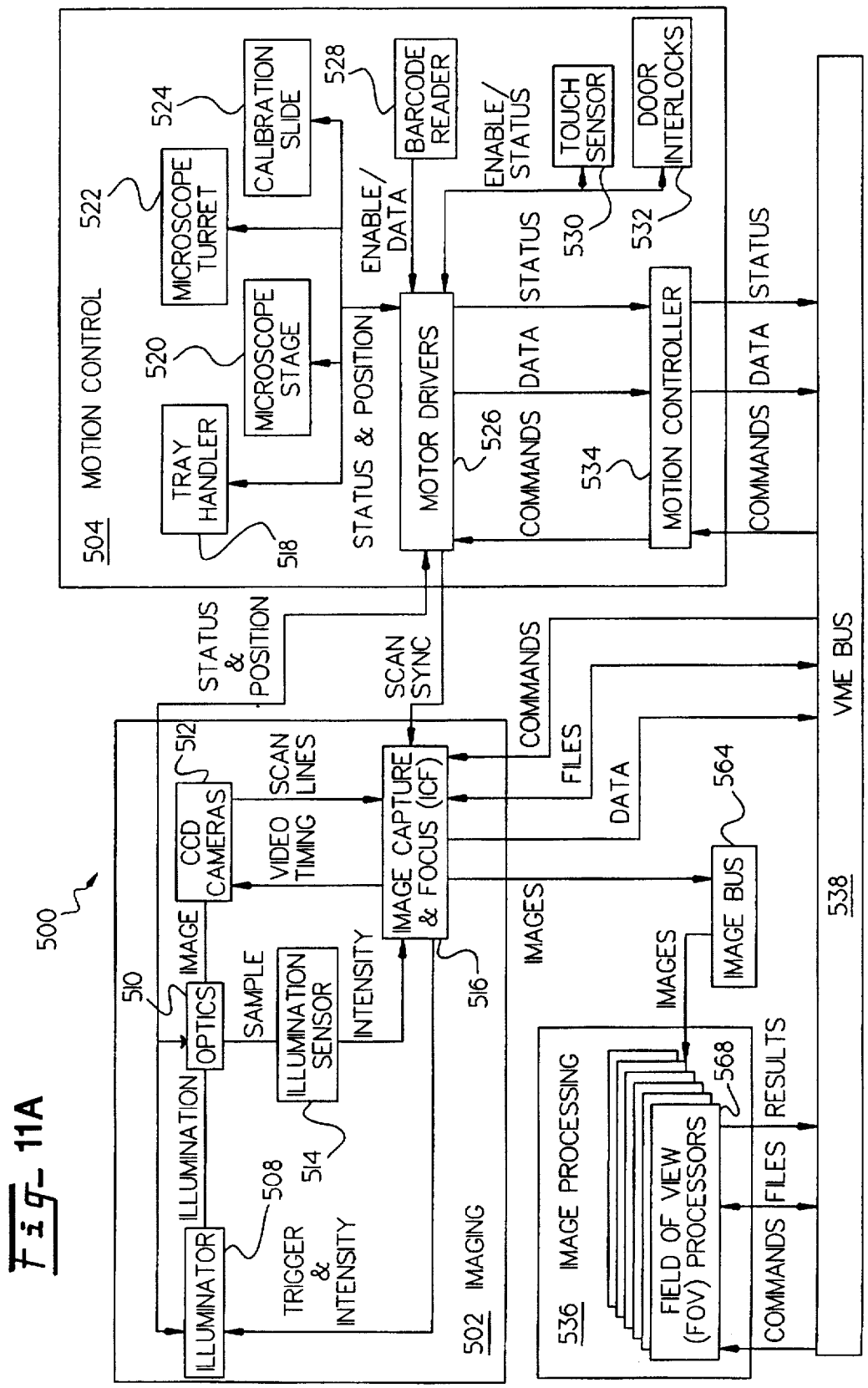
FIGS. 11A, 11B and 11C show one example of a classification system employing the method of the invention.
Figure 11B:
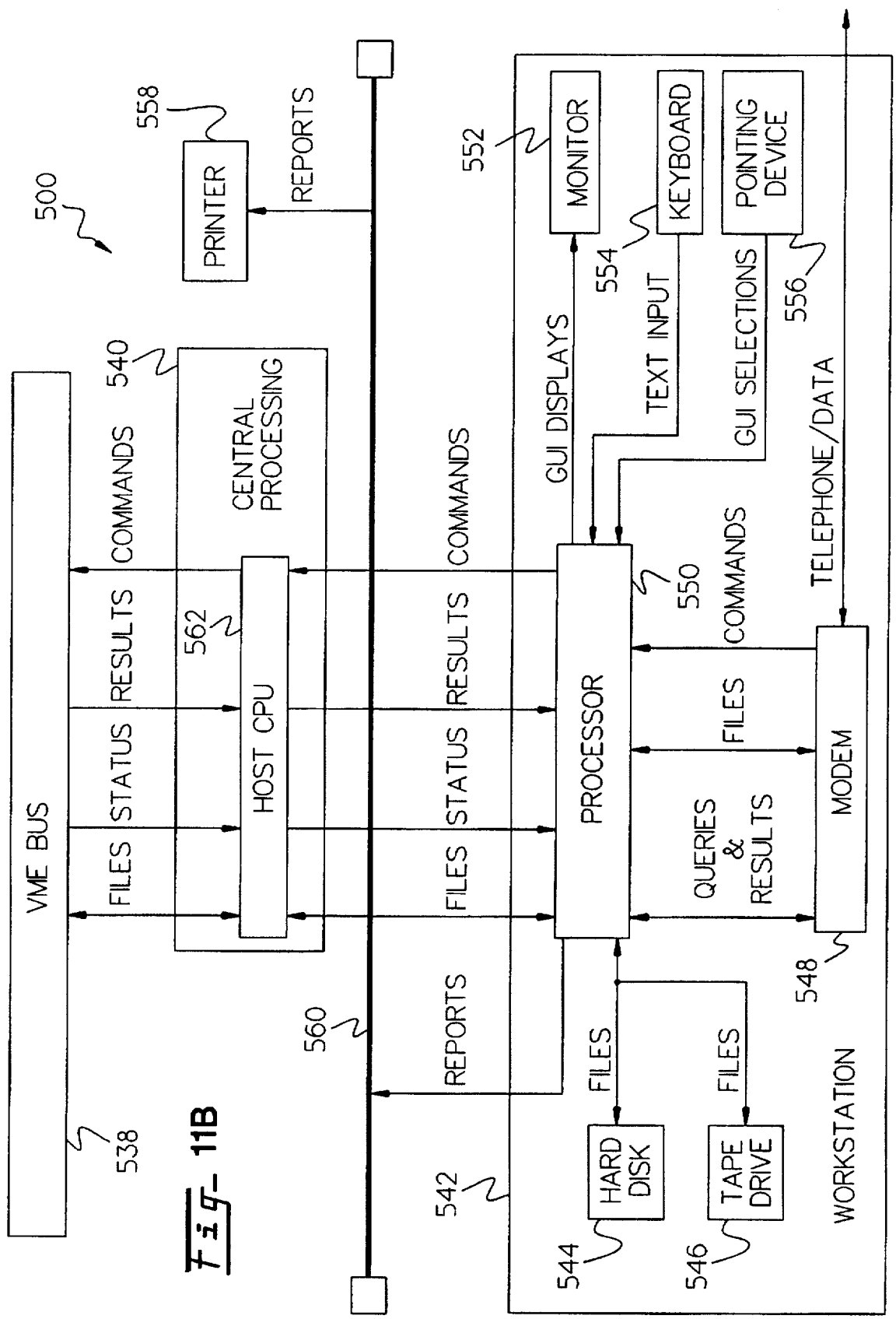
Figure 11C:
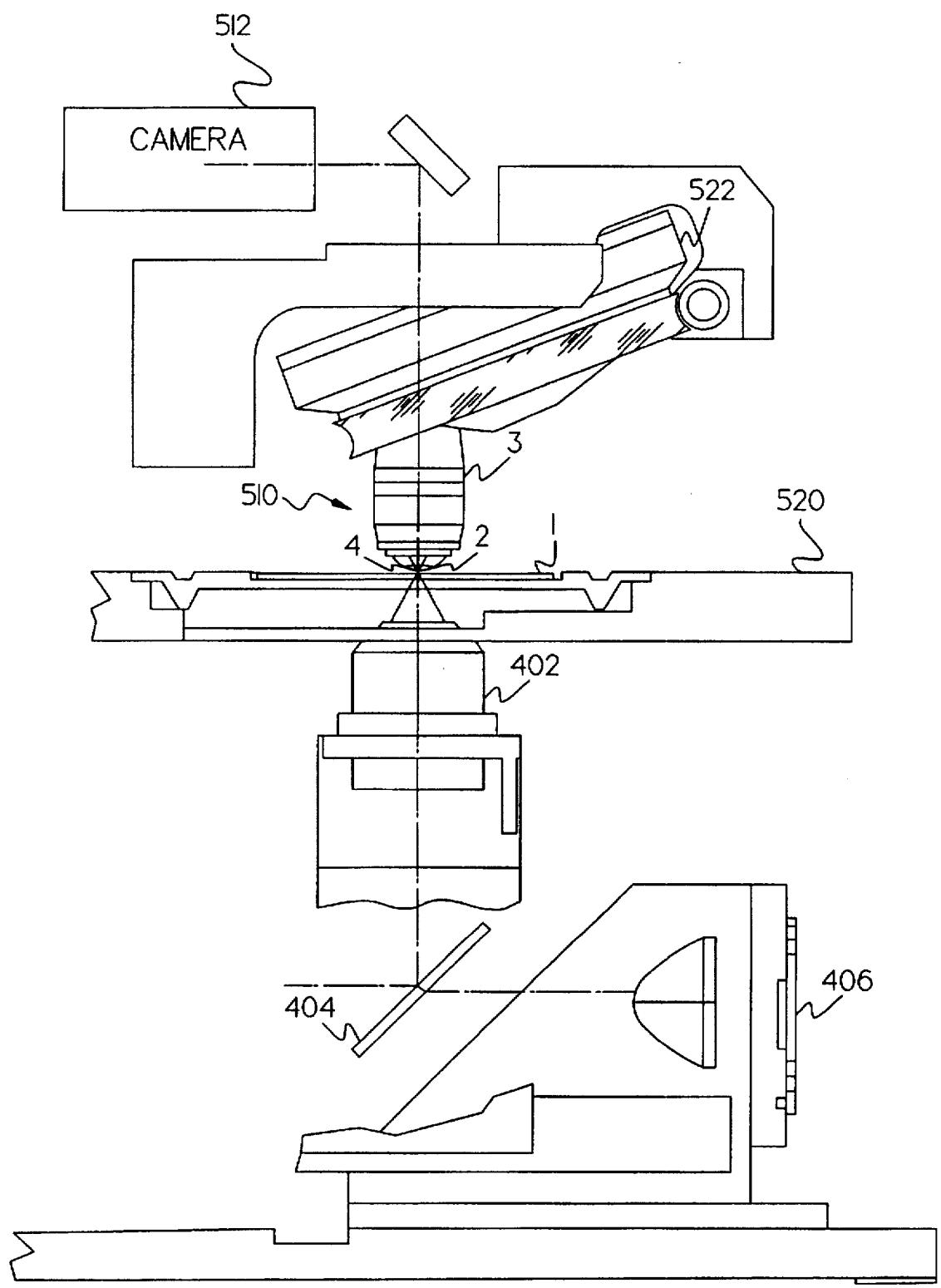

Now refer to FIGS. 11A, 11B and 11C which show a schematic diagram of one embodiment of the apparatus of the invention for assessing slide and specimen preparation quality 500. The apparatus of the invention comprises an imaging system 502, a motion control system 504, an image processing system 536, a central processing system 540, and a workstation 542. The imaging system 502 is comprised of an illuminator 508, imaging optics 510, a CCD camera 512, an illumination sensor 514 and an image capture and focus system 516. The image capture and focus system 516 provides video timing data to the CCD cameras 512, the CCD cameras 512 provide images comprising scan lines to the image capture and focus system 516. An illumination sensor intensity is provided to the image capture and focus system 516 where an illumination sensor 514 receives the sample of the image from the optics 510. In some embodiments optics 510 may comprise color filters. In one embodiment of the invention, the optics may further comprise an automated microscope 511. The illuminator 508 provides illumination of a slide. The image capture and focus system 516 provides data to a VME bus 538. The VME bus 538 distributes the data to an image processing system 536. The image processing system 536 is comprised of field-of-view processors 568. The images are sent along the image bus 564 from the image capture and focus system 516. A central processor 540 controls the operation of the invention through the VME bus 538. In one embodiment the central processor 562 comprises a MOTOROLA 68030 CPU. Other equivalent processors or computers may also be used. The motion controller 504 is comprised of a tray handler 518, a microscope stage controller 520, a microscope tray controller 522, and a calibration slide 524. The motor drivers 526 position the slide under the optics. A bar code reader 528 reads a barcode located on the slide 524. A touch sensor 530 determines whether a slide is under the microscope objectives, and a door interlock 532 prevents operation in case the doors are open. Motion controller 534 controls the motor drivers 526 in response to the central processor 540. An Ethernet communication system 560 communicates to a workstation 542 to provide control of the system. A hard disk 544 is controlled by workstation 550. In one embodiment, workstation 550 may comprise a workstation. A tape drive 546 is connected to the workstation 550 as well as a modem 548, a monitor 552, a keyboard 554, and a mouse pointing device 556. A printer 558 is connected to the Ethernet 560.

During operation, the central computer 540, running a real time operating system, controls the microscope 511 and the processor to acquire and digitize images from the microscope 511. The computer 540 also controls the microscope 511 stage to position the specimen under the microscope objective, and from one to fifteen field of view (FOV) processors 568 which receive images under control of the computer 540.

It is to be understood that the various processes described herein may be implemented in software suitable for running on a digital processor. The software may be embedded, for example, in the central processor 540.

The invention has been described herein in considerable detail in order to comply with the Patent Statutes and to provide those skilled in the art with the information needed to apply the novel principles and to construct and use such specialized components as are required. However, it is to be understood that the invention can be carried out by specifically different equipment and devices, and that various modifications, both as to the equipment details and operating procedures, can be accomplished without departing from the scope of the invention itself.

What is claimed is:

1. A method for measuring information reliability in an image interpretation system comprising the steps of:
   (a) obtaining at least one image;
   (b) obtaining image information about said at least one image by interpreting said at least one image;
   (c) extracting at least one reliability feature from said image information, said reliability feature representing at least one characteristic of the image content; and
   (d) evaluating said at least one reliability feature against at least one predetermined criteria to obtain at least one information reliability measurement.

2. The method of claim 1 further comprising the step of improving said information reliability of said image information by changing said interpretation of said at least one image in response to said at least one information reliability measurement.

3. An information reliability measuring apparatus for measuring information reliability in an image interpretation system comprising:
   (a) means for obtaining at least one image having at least one image output;
   (b) means for obtaining image information about said at least one image, connected to said at least one image output, by interpreting said at least one image, wherein said means for obtaining image information has an image information output;
   (c) means for extracting at least one reliability feature connected to said image information output, said reliability feature representing at least one characteristic of the image content and wherein the means for extracting further has a reliability feature output; and
   (d) means for evaluating said at least one reliability feature against at least one predetermined criteria to obtain at least one information reliability measurement connected to the reliability feature output and wherein the means for evaluating has an information reliability measurement output.

4. The apparatus of claim 3 further comprising a means for improving said information reliability of said image information by changing said interpretation of said at least one image in response to said at least one information reliability measurement connected to the information reliability measurement output and image information output, wherein the means for improving said reliability has a improved image information output.

5. A method for measuring object segmentation robustness comprising the steps of:
   (a) identifying at least one object;
   (b) computing at least one segmentation robustness feature of said at least one object; and
   (c) computing an object segmentation robustness measure responsive to said at least one segmentation robustness feature to determine a potential variability of segmentation of the at least one object.

6. The method of claim 5 further comprising the step of classifying said at least one object to provide at least one object classification result.

7. The method of claim 5 wherein the step of identifying at least one object further comprises the steps of:
   (a) illuminating a field of view containing at least one object;
   (b) obtaining at least one image of said field of view; and
   (c) identifying said at least one object in said at least one image.

8. The method of claim 5 wherein the step of computing at least one segmentation robustness feature further comprises the step of computing at least one likelihood of segmentation instability measure.

9. The method of claim 8 further comprising the step of computing the at least one likelihood of segmentation instability measure as a likelihood of segmentation instability due to noise in at least one image.

10. The method of claim 8 further comprising the step of computing the segmentation instability measurement as a likelihood of segmentation instability due to object context.

11. The method of claim 8 further comprising the steps of:
   (a) illuminating a field of view containing at least one object;
   (b) obtaining at least one image of said field of view wherein said at least one image has a background; and
   (c) identifying said at least one object in said at least one image.

12. The method of claim 8 further comprising the step of computing said at least one likelihood of segmentation instability measure as a likelihood of segmentation instability caused by insufficient contrast between said at least one object and the background.

13. The method of claim 5 wherein said at least one object further comprises at least one biological cell.

14. The method of claim 5 wherein said at least one object further comprises at least one biological cell nucleus.

15. The method of claim 6 further comprising the step of combining said object segmentation robustness measure with said at least one object classification result.

16. The method of claim 15 further comprising the step of enhancing overall classification reliability.

17. The method of claim 15 wherein the step of combining further comprises weighting said at least one object classification result having higher segmentation robustness measure with a higher weight.

18. The method of claim 15 wherein the step of combining further comprises weighting said at least one object classification result with a weight whose value is determined by the segmentation robustness measure.

19. The method of claim 15 wherein the step of combining further comprises the steps of:
   (a) compiling a histogram of at least one object segmentation robustness measure to generate histogrammed data;
   (b) computing at least one classification reliability feature responsive to said histogrammed data; and
   (c) computing an enhanced object classification result responsive to said at least one classification reliability feature and at least one object classification result using at least one predetermined criteria.

20. The method of claim 5 wherein said at least one object further comprises a biological cell contained in a biological specimen.

21. The method of claim 20 wherein said at least one biological cell nucleus is contained in a biological specimen.

22. An object segmentation robustness measurement apparatus comprising:
   (a) means for identifying at least one object having at least one object output;
   (b) means for computing at least one segmentation robustness feature of said at least one object connected to said at least one object output, wherein the means for computing at least one segmentation robustness feature has at least one segmentation robustness feature output; and
   (c) means for computing an object segmentation robustness measure responsive to said at least one segmentation robustness feature, connected to said at least one segmentation robustness feature output to determine a potential variability of segmentation of the at least one object.

23. The apparatus of claim 22 further comprising a means for classifying said at least one object to provide at least one object classification result.

24. The apparatus of claim 22 wherein the means for identifying at least one object further comprises:
   (a) means for illuminating a field of view containing at least one object;
   (b) means for obtaining at least one image of said field of view, wherein the means for obtaining has at least one image output; and
   (c) means for identifying at least one object in said at least one image, connected to said at least one image output.

25. The apparatus of claim 22 wherein the means for computing at least one segmentation robustness feature further comprises a means for computing at least one likelihood of segmentation instability measure.

26. The apparatus of claim 22 wherein said means for computing at least one segmentation robustness feature measures at least one likelihood of segmentation instability due to noise in said at least one image.

27. The apparatus of claim 22 wherein said means for computing at least one segmentation robustness feature measures at least one likelihood of segmentation instability due to object context.

28. The apparatus of claim 22 wherein said means for computing at least one segmentation robustness feature further comprises:
   (a) means for illuminating a field of view containing at least one object;
   (b) means for obtaining at least one image of said field of view wherein the at least one image has a background, and wherein the means for obtaining at least one image has at least one image output; and
   (c) means for identifying said at least one object in said at least one image, connected to said at least one image output, wherein the means for identifying said at least one object has at least one identified object output; and
   (d) means for computing the instability measurement as a likelihood of segmentation instability caused by insufficient contrast between said at least one object and the background, connected to said at least one identified object output.

29. The apparatus of claim 22 wherein said at least one object further comprises at least one biological cell.

30. The apparatus of claim 22 wherein said at least one object further comprises at least one biological cell nucleus.

31. The apparatus of claim 23 further comprising a means for combining said object segmentation robustness measure with said at least one object classification result.

32. The apparatus of claim 31 further comprising a means for enhancing overall classification reliability.

33. The apparatus of claim 31 wherein the means for combining further comprises a means for weighting said at least one object classification result having higher segmentation robustness measure with a higher weight.

34. The apparatus of claim 31 wherein the means for combining further comprises a means for weighting said at least one object classification result with a weight whose value is determined by the segmentation robustness measure.

35. The apparatus of claim 31 wherein the means for combining further comprises:
   (a) means for compiling a histogram of at least one object segmentation robustness measure to generate histogrammed data;
   (b) means for computing at least one classification reliability feature responsive to said histogrammed data; and
   (c) means for computing an overall object classification result responsive to said at least one classification reliability feature and at least one object classification result.

36. The apparatus of claim 22 wherein said at least one object further comprises at least one biological cell contained in a biological specimen.

37. The apparatus of claim 36 wherein said at least one biological cell nucleus is contained in a biological specimen.

38. A method for robust object classification comprising the steps of:
   (a) identifying at least one object;
   (b) classifying said at least one object based on an object feature value to provide at least one object classification result; and
   (c) computing a classification decisiveness measure for said at least one object classification result, said decisiveness measure being the difference between the probability that the classification result is correct and the probability that the classification result is incorrect.

39. The method of claim 38 wherein the step of classifying said at least one object further comprises applying a decision tree classifier.

40. The method of claim 38 wherein the step of computing a classification decisiveness measure further comprises characterizing a decision tree classifier.

41. The method of claim 40 further comprising the step of computing at least one probability for at least one path down said decision tree.

42. The method of claim 41 wherein said at least one probability is responsive to a configuration of an object classifier and feature sensitivity to system noise.

43. The method of claim 38 further comprising the step of combining said classification decisiveness measure with said at least one object classification result.

44. The method of claim 43 further comprising the step of enhancing overall classification reliability.

45. The method of claim 43 wherein the step of combining further comprises weighting objects having higher classification decisiveness measure with a higher weight.

46. The method of claim 43 further comprising the step of weighting said at least one object classification result with a weight whose value is determined by the classification decisiveness measure.

47. The method of claim 43 wherein the step of combining further comprises the steps of:
   (a) compiling a histogram of at least one classification decisiveness measure to generate histogrammed data;
   (b) computing at least one classification reliability feature responsive to said histogrammed data; and
   (c) computing an enhanced object classification result responsive to said at least one classification reliability feature and said at least one object classification result.

48. The method of claim 38 wherein the step of identifying at least one object further comprises the steps of:
   (a) illuminating a field of view containing at least one object;
   (b) obtaining at least one image of said field of view; and
   (c) identifying said at least one object in said at least one image.

49. The method of claim 38 wherein said at least one object is a cell nucleus.

50. The method of claim 49 wherein said cell nucleus is contained in a biological specimen.

51. An apparatus for the measurement of object classification robustness comprising:
   (a) means for identifying at least one object having at least one object output;
   (b) means for classifying said at least one object based on an object feature value to provide at least one object classification result, connected to said at least one object output, and having at least one object classification result output; and
   (c) means for computing a classification decisiveness measure for said at least one object classification result, connected to said at least one object classification result output, said decisiveness measure being the difference between the probability that the classification result is correct and the probability that the classification result is incorrect.

52. The apparatus of claim 51 wherein the means for classifying said at least one object further comprises means for applying a decision tree classifier.

53. The apparatus of claim 51 wherein the means for computing a classification decisiveness measure further comprises a means for computing at least one probability for at least one path down a decision tree classifier.

54. The apparatus of claim 53 wherein said at least one probability is responsive to a configuration of an object classifier and feature response to system noise.

55. The apparatus of claim 51 further comprising a means for combining said classification decisiveness measure with said at least one object classification result.

56. The apparatus of claim 55 further comprising a means for enhancing overall classification reliability.

57. The apparatus of claim 55 wherein the means for combining further comprises a means for weighting said at least one object classification result having higher segmentation robustness measure with a higher weight.

58. The apparatus of claim 55 wherein the means for combining further comprises a means for weighting said object classification result with a weight whose value is determined by the classification decisiveness measure.

59. The apparatus of claim 55 wherein the means for combining further comprises:
   (a) means for compiling a histogram of at least one classification decisiveness measure to generate histogrammed data;
   (b) means for computing at least one classification reliability feature responsive to said histogrammed data; and
   (c) means for computing an enhanced object classification result responsive to said classification reliability feature and at least one object classification result.

60. The apparatus of claim 52 wherein said means for identifying at least one object further comprises:
   (a) means for illuminating a FOV containing at least one object;
   (b) means for obtaining at least one image of said FOV; and
   (c) means for identifying at least one object in said at least one image.

61. The apparatus of claim 52 wherein said at least one object is a cell nucleus.

62. The apparatus of claim 61 wherein said cell nucleus is contained in a biological specimen.

63. A method for the measurement of object classification robustness comprising the steps of:

(a) identifying at least one object to generate at least one object output;

(b) classifying said at least one object based on an object feature value to provide at least one object classification result from said at least one object output;

(c) evaluating a robustness of segmentation of said at least one object to provide a segmentation robustness measure from said at least one object output to determine a potential variability of segmentation of the at least one object; and (d) evaluating a decisiveness of classification of said at least one object to provide a classification decisiveness measure from said at least one object classification result to determine a distance between the object feature value and a decision boundary.

64. The method of claim 63 further comprising the step of combining said classification decisiveness measure, said segmentation robustness measure and said object classification result to provide enhanced classification reliability.

65. The method of claim 63 further comprising the step of changing object classification results.

66. The method of claim 64 further comprising the steps of weighting said at least one object classification result with at least two weights, wherein the value of the first weight is determined by the segmentation robustness measure and the value of the second weight is determined by the classification decisiveness score.

67. The method of claim 63 further comprising the steps of:

(a) compiling a scattergram of at least one segmentation robustness measure and at least one classification decisiveness measure to generate a scattergrammed data output;

(b) computing at least one classification reliability feature from said scattergrammed data output, to generate at least one classification reliability feature output; and (c) computing at least one enhanced object classification result from said at least one classification reliability weighting feature output and at least one object classification result output.

68. An apparatus for the measurement of object classification robustness comprising:

(a) means for identifying at least one object having at least one object output;

(b) means for classifying said at least one object based on an object feature value to provide at least one object classification result connected to said at least one object output;

(c) means for evaluating robustness of segmentation of said at least one object to provide a segmentation robustness measure connected to said at least one object output to determine a potential variability of segmentation of the at least one object; and (d) means for evaluating decisiveness of classification of said at least one object to provide a classification decisiveness measure connected to said at least one object classification result to determine a distance between the object feature value and a decision boundary.

69. The apparatus of claim 68 further comprising a means for combining said classification decisiveness measure, said segmentation robustness measure and said object classification result to provide enhanced classification reliability.

70. The apparatus of claim 68 further comprising a means for changing object classification results.

71. The apparatus of claim 69 wherein the means for combining further comprises weighting said at least one object classification result with at least two weights wherein the value of the first weight is determined by the segmentation robustness measure and the value of the second weight is determined by the classification decisiveness score.

72. The apparatus of claim 68 further comprising a means for robust classification comprising:

(a) means for compiling a scattergram of at least one segmentation robustness measure and at least one classification decisiveness measure having a scattergrammed data output;

(b) means for computing at least one classification reliability feature connected to said scattergrammed data output, and having at least one classification reliability feature output; and (c) means for computing at least one enhanced object classification result connected to said at least one classification reliability weighting feature output and at least one object classification result output.

73. A robust classifier comprising:

(a) means for compiling a scattergram of at least one segmentation robustness measure and at least one classification decisiveness measure having a scattergrammed data output;

(b) means for computing at least one classification reliability feature connected to said scattergrammed data output, and having at least one classification reliability feature output; and (c) means for computing at least one enhanced object classification result connected to said at least one classification reliability weighting feature output and at least one object classification result output.

\* \* \* \* \*

UNITED STATES PATENT AND TRADEMARK OFFICE
CERTIFICATE OF CORRECTION

PATENT NO. : 5,745,601
DATED : April 28, 1998
INVENTOR(S) : Lee et al.

It is certified that error appears in the above-identified patent and that said Letters Patent is hereby corrected as shown below:

Column 10, line 20, delete the word "apparatus" and replace it with
-- Apparatus --.

Column 10, line 24, delete the word "apparatus" and replace it with
-- Apparatus --.

Column 10, line 35, delete the word "apparatus" and replace it with
-- Apparatus --.

Signed and Sealed this

Twenty-third Day of February, 1999

Attest:

Q. TODD DICKINSON

*Attesting Officer*          *Acting Commissioner of Patents and Trademarks*